Feb. 4, 1964

R. M. HEDEMAN 3,120,326

BEVERAGE DISPENSER CONDUIT PURGING DEVICE

Filed Aug. 26, 1960

INVENTOR
Robert M. Hedeman

BY Clive H Bramson

ATTORNEY

Feb. 4, 1964   R. M. HEDEMAN   3,120,326
BEVERAGE DISPENSER CONDUIT PURGING DEVICE
Filed Aug. 26, 1960   3 Sheets-Sheet 2

INVENTOR
Robert M. Hedeman

BY *Clive H. Bramson*

ATTORNEY

Feb. 4, 1964    R. M. HEDEMAN    3,120,326
BEVERAGE DISPENSER CONDUIT PURGING DEVICE
Filed Aug. 26, 1960    3 Sheets-Sheet 3

INVENTOR
Robert M. Hedeman

BY Clive H. Bramson

ATTORNEY

3,120,326
BEVERAGE DISPENSER CONDUIT PURGING DEVICE
Robert M. Hedeman, 14 Foxwood Road,
Kings Point, N.Y.
Filed Aug. 26, 1960, Ser. No. 52,148
9 Claims. (Cl. 222—144.5)

This invention relates to novel and useful beverage dispensing apparatus and more particularly to automatic means for purging the syrup and/or liquor lines thereof.

Objects and advantages of the invention will be set forth in part hereinafter and in part will be obvious herefrom, or may be learned by practice of the invention, the same being realized and attained by means of the instrumentalities and combinations pointed out in the appended claims.

The invention consists in the novel parts, constructions, arrangements, combinations and improvements herein shown and described.

The accompanying drawings referred to herein and constituting a part hereof, illustrate one embodiment of the invention, and together with the description, serve to explain the principles of the invention.

Figure 1:
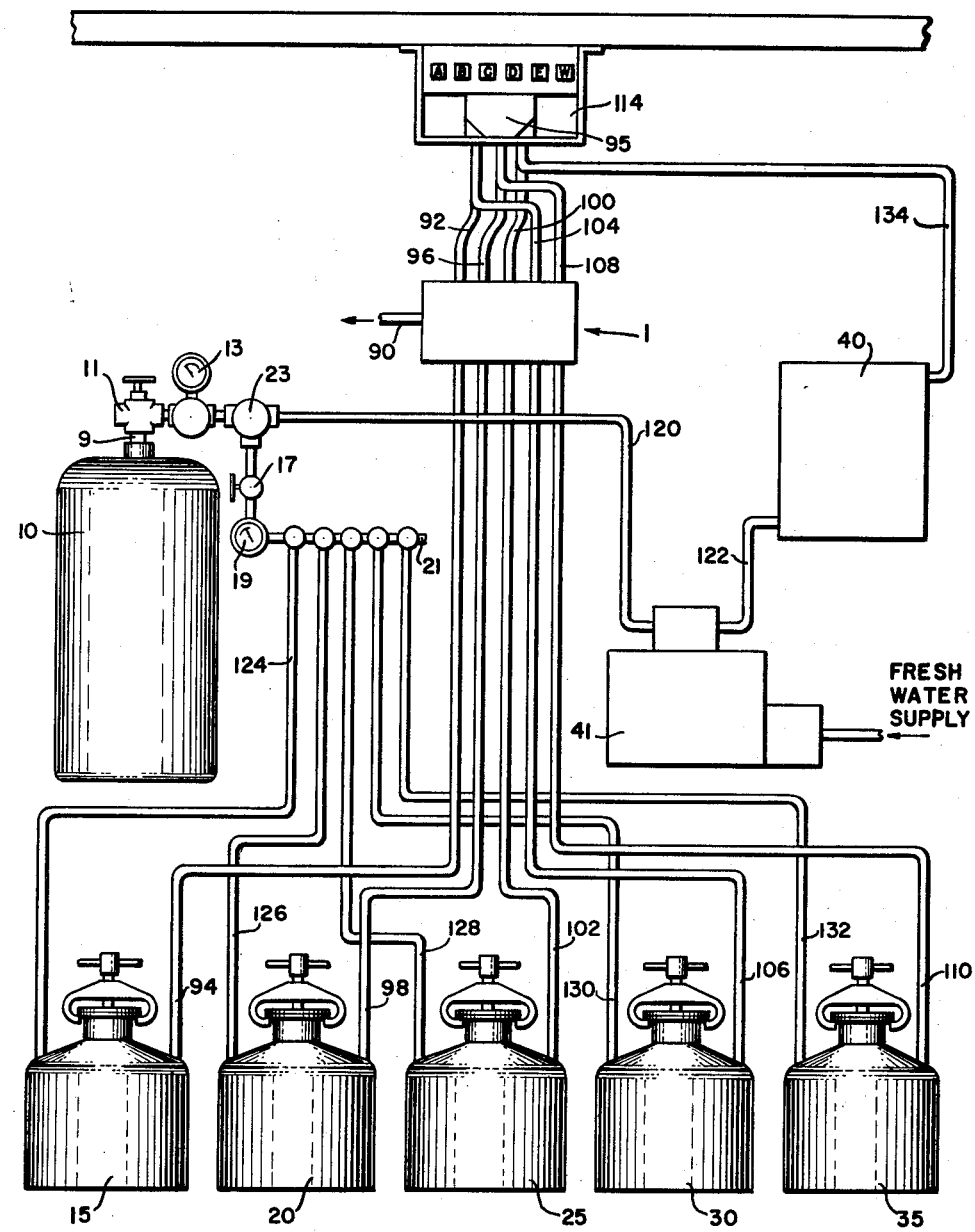
FIG. 1 is a diagrammatic showing of an apparatus embodying the instant invention, the various parts thereof being shown substantially in their mechanical forms and being arranged as in an expanded flow diagram rather than in their actual positions in the apparatus.

The invention is directed to providing improvements in beverage dispensing machines, particularly machines for carbonated beverages and especially those wherein a plurality of different beverages or flavors may be selected by the customer.

One object of the invention is to provide novel means enabling the expurgation of syrup and/or liquor product lines and passages communicating with flavor supply tanks and the beverage exit nozzle of a beverage dispensing apparatus.

Another object of the instant invention is the provision of means whereby cleansing of product lines may be accomplished without external implementation and solely by dint of a back-flush manifold block positioned intermediate flavor supply tank lines and discharge nozzle.

A further object of the present inventon is to provide a syrup and/or liquor product line purging instrumentality integral with the beverage dispensing apparatus whereby the necessity of disconnecting parts of the apparatus for the purpose of cleansing is eliminated.

Another object of the invention is the provision of a rapid and automatic product line purging device, the internal passages thereof being transparent for observation and bereft of threaded junctures for purposes of sanitation.

Still another object of the instant invention is the provision of control means whereby selection for purging of a desired product line passage may be readily accomplished and thereafter automatically effectuated.

A still further object of the present invention is the provision of a back-flush device in communicative relation with a pressurized water source, said pressurized water source normally earmarked a constituent of the beverage dispensed, being readily utilized, in lieu of being dispensed, as the cleansing agent of a predetermined product line.

Another object of the present invention is to provide a back-flush device whereby syrup and/or liquor product lines connected with a plurality of flavor supply tanks may be purged through a common drain conduit, the normally attendant danger of backflow into said supply tanks being completely obviated thereby.

Another object of the invention is to combine with novel features of flavor selectively and electrical control of the dispensing apparatus, a basic product line flushing device operable at any time notwithstanding the level of syrup and/or liquor contained within the flavor fluid supply tanks.

It will be understood that the foregoing general objectives and the following detailed description as well are exemplary and explanatory but are not restrictive of the invention. Referring now in detail to the present preferred embodiment of the invention illustrated by way of example in the accompanying drawings, FIGURE 1 shows the back-flush manifold block designated generally by numeral 1 positioned intermediate a plurality of syrup and/or fluid tanks and the dispensing nozzle of a beverage dispensing apparatus according to the invention.

Essentially, the present invention is directed to providing a basic improvement in a beverage dispensing apparatus and is primarily concerned with the purging or flushing of syrup and/or liquor flavor transporting lines together with other passages functioning as carrier conduits for said fluids. Prior to reduction to practice of the instant invention, cleansing of such passages called for mandatory disassembly of at least a portion of said beverage dispensing apparatus, such disassembly involving disconnection of product conduit lines from their respective flavor supply containers or disconnection at some other juncture intermediate said flavor supply containers and the exit nozzle of the apparatus. Purging of product lines without removal thereof from their respective supply containers could not be accomplished unless the syrup and/or liquor within the said containers had first been completely consumed, the contents thereof otherwise being subject to contamination. Further, to accomplish the desired purge of product lines and passages comprising the dispensing network, as heretofore disclosed by the prior art, ancillary means for injection of flushing fluids was required. Obviously, in view of the foregoing, previous purging procedures were time consuming and inconvenient in practice.

By virture of the innovation according to the instant invention, simplification of fluid line and fluid passage cleansing is unprecedented functionally and structurally as applied to the beverage dispensing art.

A general understanding of the arrangement and location of the parts of the novel apparatus as shown in FIGURE 1 discloses the cooperation of the elements in combination in diagrammatic form. In general the elements comprising the complete apparatus consist of a conventional supply of carbon dioxide shown as pressure tank 10; a conventional refrigeration unit 40 which may comprise any suitable power-operated refrigerating mechanism; a carbonating unit 41 having a fresh water supply connected therewith; the syrup or flavor supply unit comprising a plurality of syrup tanks 15, 20, 25, 30 and 35; a beverage exit nozzle 95; a conduit block 112 containing electrically operated solenoid valves responsive to selection buttons A, B, C, D, E and W located upon control panel 114; and the said back-flush manifold block 1 illustrated in detail in FIGURES 3, 4 and 5. As shown said units are arranged to illustrate their functional relationships, but in practice they are mounted within an appropriate enclosure which may be of any suitable type commonly known and used for dispensing beverages into receptacles. The particular construction of such enclosures and the arrangement of the several operating units therein may take various forms without departing from the spirit of the invention.

As shown in FIGURE 1 of the drawings, carbon dioxide gas, contained under pressure within tank 10, is led directly to carbonator 41 through conduit 120 and is distributed from manifold 21 to syrup and/or liquor supply containers 15, 20, 25, 30 and 35. Regulator valve 11 and pressure indicator 13, in combination, function to permit regulation of carbon dioxide gas emitted through primary outlet line 9 of said tank 10 with respect to rate of flow and pressure thereof as required for water carbonation in carbonator 41. Regulator valve 17 and pressure indicator 19 connected with the said primary outlet line by connecting T 23 similarly regulate carbon dioxide flow and pressure to manifold 21 wherefrom said gas is delivered to said flavor supply containers. A pressure of approximately 15 p.s.i. maintained above the fluid level within said containers adequately induces syrup and/or liquor flow through lines 94, 98, 102, 106 and 110 for ultimate mixing and delivery through exit nozzle 95. Hence, manifold 21, together with gas and fluid lines in communication therewith, comprise a low pressure system. In contrast thereto gas line 120 and fluid lines 122 and 134 are maintained at substantially greater pressures, the primary reason therefor being the formation of and maintenance of a carbon dioxide-fresh water mixture. Upon accomplishment of that end, carbonated water thus produced is educted along a path including a cooling unit designated 40 which is preferably maintained at a desired temperature. Thence from the said cooling unit 40, chilled carbonated water maintained under pressures regulated within the range of 30–100 p.s.i., is carried via line 134 for ultimate mixing and delivery through exit nozzle 95.

Consonant with the foregoing stated objects of the instant invention, back-flush manifold block 1, positioned as shown in the drawings, manifests the unique and unobvious function of selective purging of a fluid flow network, through cooperative utilization of pressure differentials inherently present in apparatus of the nature herein described.

Figure 4:
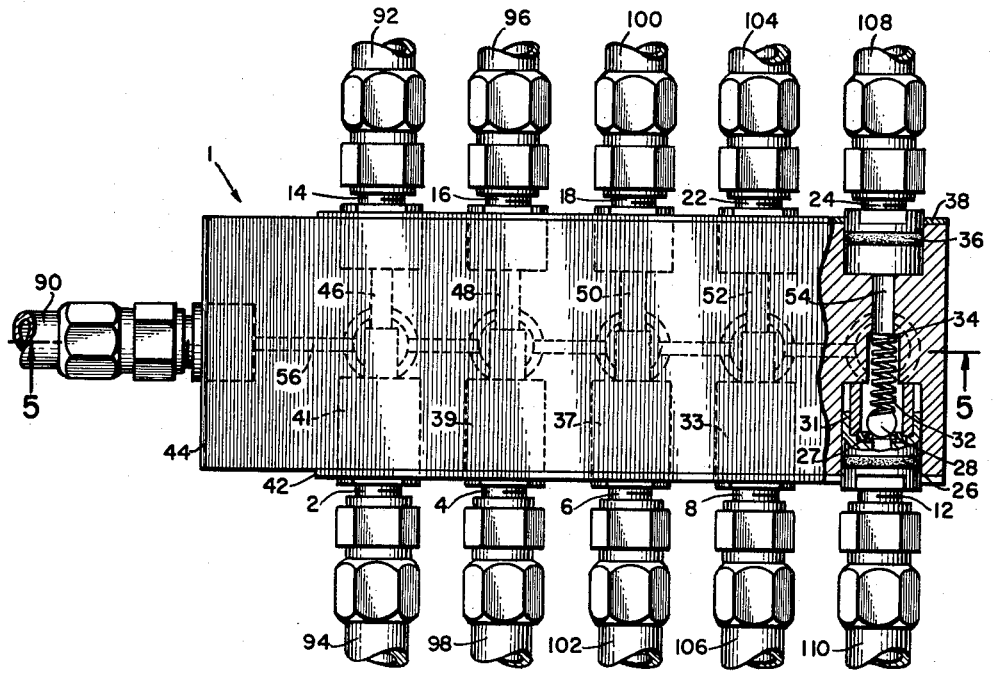
FIG. 4 is a top plan view of the back-flush manifold block certain parts thereof being shown in horizontal section.

Reference is made to FIGURE 4 of the drawings wherein a plan projection of the back-flush manifold block is shown, flavor fluid lines being illustrated in inlet and outlet relation with said back-flush manifold block. As seen, the said manifold block interjected as a unit between exit nozzle and flavor supply tanks, houses check valves 31, 33, 37, 39 and 41, each of said respective valves being positioned immediately downstream following inlet lines 94, 98, 102, 106 and 110 to assure unidirectional flow.

Check valve 31 illustrated sectionally, is structurally and functionally representative of each of the five valve members positioned in equal spaced relation on the inlet side of the back-flush manifold block. Circular ring 27 forms a seat wherein ball check element 28 is removably seated. Compression spring 32, biased between shoulder 34 and said ball check element 28, provides restraining force sufficient to retain ball check 28 within ring 27 thereby precluding undesired syrup and/or liquor flow beyond the said port. Upon activation of a cycle controlling the discharge of a portion of one of the drinks, i.e., by depressing one of the buttons located on control panel 114, flavor fluid, under pressure approximately 15 p.s.i., will be urged through the respective product line according to the drink selected; through the corresponding check valve member; through the back-flush manifold block through the respective product line extending from said manifold block and ultimately therefrom into conduit block 112 (FIGURES 2 and 3) for final mixing and discharge at exit nozzle 95. It will be readily observed, that by virtue of the automatic operation of said check valve 31, flavor fluid is permitted to flow in one direction, i.e, downstream, reversed flow being curtailed by means of ball check 28.

Specifically and by way of illustration, the unidirectional flow of flavor syrup contained within supply tank 35 e.g., is accomplished pursuant to the exertion of a 15 p.s.i. gaseous carbon dioxide atmosphere above the fluid level within said supply tank, said pressure being transmitted thereto through gas line 132 connected with low pressure manifold 21. Upon energization of a respective solenoid actuated valve (not shown) situated within conduit block 112, product line 110 extending from manifold block 1 is permitted communication with the atmosphere. Thus, pressurized flow through product line 110 to check valve 31 is accomplished, the pressure within product line 110 being sufficient to dislodge ball check element 28 within said check valve thereby permitting flow therethrough. Accordingly, flow through the said manifold block and through corresponding outlet conduit 108 will continue for the duration of solenoid valve energization.

Figure 2:
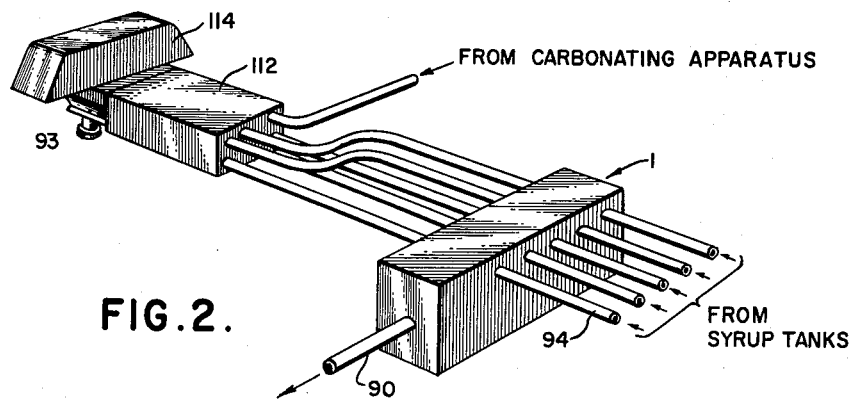
FIG. 2 is a perspective view in isolation of a segment of the diagram of FIG. 1.
Figure 5:
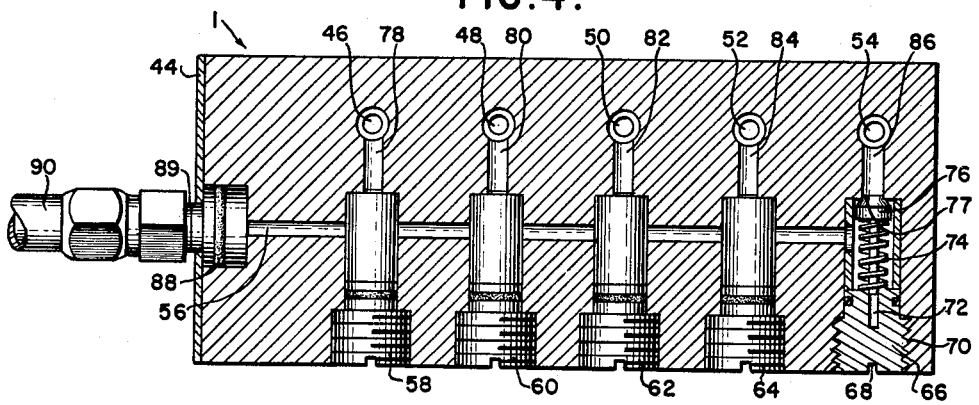
FIG. 5 is a side elevation view of the back-flush manifold block taken in section along line 5—5 of FIG. 4.

Manifold conduit 56, positioned longitudinally and substantially axially of back-flush manifold block 1 is, as seen in FIGURE 5 of the drawings in registry with each of vertical passageways 78, 80, 82, 84 and 86, said orifices being normal to and in communication with horizontally disposed respective passageways 46, 48, 50, 52 and 54. Said manifold conduit terminating at insert collar 89, further extends to drain line 90 as shown in FIGURE 2 of the drawings.

Figure 3:
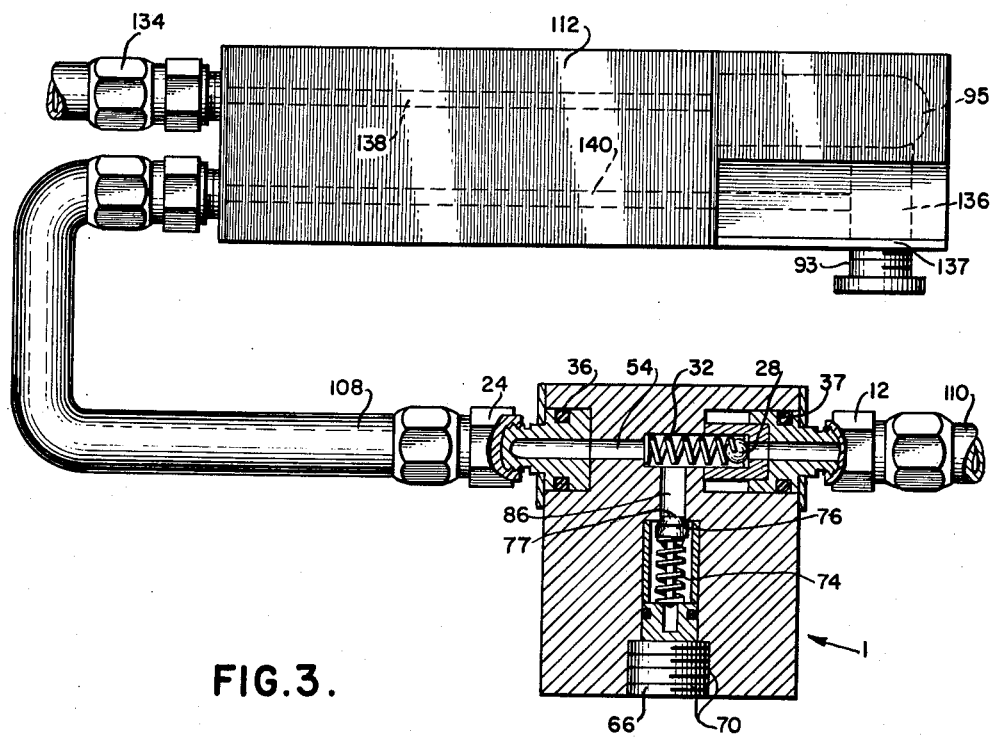
FIG. 3 is an elevational view of the parts shown in FIG. 2, one of the parts thereof being in vertical section.

While manifold conduit 56, as aforedescribed, is in common registry with each of said vertical passageways, communication therebetween is normally restricted by virtue of respective pressure responsive valves 58, 60, 62, 64 and 66. Reference to FIGURES 3 and 5 of the drawings discloses a cross sectional view of pressure responsive valve 66, it being obvious therefrom that communication among horizontal orifice 54, vertical passageway 86 and longitudinal manifold 56 would be unrestricted but for pressure responsive valve element 76 seated within port 77 of valve member 66. Clearance, therefore, of said port 77, being accomplished through exertion of downward fluid pressure against valve element 76, would effectuate drainage of fluids within the aforesaid passageways through said manifold conduit 56. Compression of coil spring 74 positioned about guide stem 72, is adjustably compressible according to the setting of threadedly received support member 70 integrally related with respect to said guide stem 72. Bias of valve element 76 against port 77 varying with the threaded position of support member 70, is therefore dependent upon the predetermined setting thereof as controlled by rotating said support member by means of kerf 68 provided in the base thereof. Drainage of horizontal passageways 46, 48, 50 and 52 is similarly controlled.

Product lines 92, 96, 100, 104 and 108 extending with respect to the outlet side of back-flush manifold block 1, carry syrup and/or liquor to conduit block 112 for ultimate mixing and discharge within downwardly depending mixing zone 136 of exit nozzle 95. Carbonated water flowing through refrigerating unit 40 is educted through conduit 134 under regulated pressures within the range of 30–100 p.s.i., said carbonated water passing through orifice 138 of conduit block 112 upon energization of a normally restraining solenoid valve (not shown).

According to the flow diagram illustrated in FIGURE 1, of the drawings a segment thereof being further presented in the expanded form of FIGURE 3, it will be observed that preclusion of discharge through opening 137 of said mixing zone 136 will occasion back-flow through conduit block orifice 140 during periods when the respective normally restraining solenoid valve disposed across said orifice (not shown) is in the energized state, this condition of course obtaining inasmuch as orifice 140 is a low pressure region relative to orifice 138 and mixing zone 136 both of the latter being part of the carbonated water high pressure system. Discharge preclusion means 93 is therefore provided to so occasion back-flow through a conduit block orifice unobstructed by an energized solenoid valve instrumentality. Conduit block orifices in addition to the one designated 140 are provided to correspond with product line extensions 92, 96, 100, and 104, orifice 140 heretofore discussed being an extension of product line 108.

It will be understood that inlet and outlet connections with respect to the said back-flush manifold block may be of any suitable type, those fittings and connections shown in the drawings hereof, however, being illustrative of a preferred manner of obtaining the desired result. To that end inlet product lines 94, 98, 102, 106 and 110 are coupled with connection adapters 2, 4, 6, 8 and 12, said adapters being countersunk within corresponding wells provided therefore within a side wall of said manifold block and hermetically retained therein by virtue of O-ring seals 27, e.g., in combination with side plate 42 securely affixed to said manifold block. Connection adapters 14, 16, 18, 22 and 24 are similarly countersunk within corresponding wells provided therefor and are similarly hermetically retained therein by virtue of O-ring seals 36, e.g., side plate 38 performing identically in function as aforesaid front plate 42. Front plate 44, connection adapter 39 and O-ring seal 38, cooperating in the manner of abovedescribed inlet and outlet product line connections, provide the desired fluid tight direct communication relationship between drain line 90 and manifold orifice 56.

The functions of the respective units of the present invention will be understandable from the description already given. However, the operation of the apparatus in its entirety will herein be described.

Depression of one of the buttons A, B, C, D or E on control panel 114 illustrated on FIGURE 1 of the drawings will activate a cycle whereby a predetermined portion of a drink according to selection, will be dispensed. Depression of button E corresponding to a Coca-Cola drink, for example, will establish communication among flavor supply tank, carbonated water supply and exit nozzle, syrup and water being automatically regulated and dispensed with respect to predetermined quantities and proportions thereof.

Accordingly, depression of button E permits carbonated water under regulated pressures within the range of 30–100 p.s.i. to flow through conduit 134 through conduit block 112 and into mixing zone 136 of exit nozzle 95. Similarly contained under pressure, but of a substantially lesser pressure than the water, Coca-Cola syrup is released for flow through its corresponding product line 110 and therefrom through unidirectional check valve 31 of back-flush manifold block 1, through extended product line 108, thence through the energized opened port of a respective solenoid valve (not shown) intermediate within conduit block 112 and thereafter into mixing zone 136 of exit nozzle 95.

While the time cycle function responsible for the volumetric content of a drink may be widely varied, a most frequently desired drink quantity has been found to be 6 ounces. The metering means having been adjusted for flow rates of 2 ounces per second, a 6 ounce drink would be dispensed in 3 seconds, the proportionate ratio of water to syrup being 5 to 1.

In the event it becomes desirable to purge exit nozzle and conduit block passages together with one or more product line extensions 92, 96, 100, 104 and/or 108, exit nozzle 95 is closed in any suitable manner, plug 93 being an instrumentality illustrated in FIGURES 2 and 3 of the drawings. Upon preclusion of flow from said exit nozzle, activation of the water dispensing cycle is effectuated by depression of button designated W. Depression of one or more of the aforesaid flavor buttons will energize one or more of the corresponding solenoid valves (not shown) thereby permitting back-flow therethrough of water under pressure, said water being of substantially greater pressure than the pressure urging syrup and/or liquor through the product lines thereof. Accordingly, the overcoming resultant pressure of water versus flavor fluid acts to curtail flow of said flavor fluid in a downstream direction, simultaneously therewith exerting adequate pressure to dislodge valve element 76 of pressure regulator 66 from closure against port 77 thereof. Fresh water alone, therefore, flowing upstream, under pressure, in the direction away from said exit orifice, flushes all passages and product lines according to the selection button or buttons depressed, upstream flow being precluded beyond check valve members 31, 33, 37, 39 and 41, and in lieu thereof, downward flow through pressure regulators 58, 60, 62, 64 and 66, and ultimate waste discharge through orifice 56 and drain line 90 being accomplished.

Subsequent to completion of the aforedescribed purging operation, removal of closure means 93 from exit nozzle orifice 137 permits resumption of normal beverage dispensing operations. It will therefore be realized that by virtue of the above disclosure, decontamination of flavor lines and instrumentalities communicative therewith is readily effectuated, the necessity of disassembly of any portion of the dispensing apparatus having been obviated.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

What is claimed is:

1. Apparatus for dispensing beverages comprising in combination, a source of carbon dioxide gas under pressure, a carbonator, a refrigeration unit, a plurality of individual syrup sources, a first plurality of conduits for conducting carbon dioxide gas to each of said syrup sources, a first conduit for conducting carbon dioxide gas from said source to said carbonator, an exit nozzle having a discharge opening through which mixed drinks are discharged, a plug member adapted to close said discharge opening, a second conduit for conducting carbonated water from said carbonator to said exit nozzle, a second plurality of conduits for conducting syrup from each of said individual syrup sources to said dispensing nozzle, and a back-flush manifold block intermediate said second plurality of conduits and said exit nozzle, means within said manifold block for maintaining unidirectional flow from said syrup sources to said exit nozzle, a manifold drain line within said manifold block, said manifold drain line being in removably communicable relation with said second plurality of conduits.

2. Apparatus for dispensing beverages comprising in combination, a source of carbon dioxide gas under pressure, a carbonator, a refrigeration unit, a plurality of individual syrup sources, a first plurality of conduits for conducting carbon dioxide gas to each of said syrup sources, a first conduit for conducting carbon dioxide gas from said source to said carbonator, an exit nozzle having a discharge opening through which mixed drinks are discharged, discharge preclusion means removably attachable over the discharge opening of said exit nozzle to effect closure thereof, a second conduit for conducting carbonated water from said carbonator to said exit nozzle, a second plurality of conduits for conducting syrup from each of said individual syrup sources to said exit nozzle, a back-flush manifold block connected intermediate said second plurality of conduits and said exit nozzle, said back-flush manifold block having valve elements for controllably permitting fluid communication between said second plurality of conduits and the atmosphere and for preventing fluid flow from said back-flush manifold block in the direction of said individual syrup sources; whereby closure of said discharge opening results in flow of carbonated water through said second plurality of conduits and thence to said back-flush manifold block and therefrom to the atmosphere.

3. A selective beverage dispensing apparatus comprising at least one flavor syrup tank, a water carbonating apparatus, an exit nozzle having a discharge opening through which mixed drinks are discharged, first conduits providing communication between each said at least one flavor syrup tank and said exit nozzle, a second conduit providing communication between said water carbonating apparatus and said exit nozzle, discharge preclusion means removably attachable to said exit nozzle to effect closure of said discharge opening thereof, a back-flush manifold block interposed between said first conduits and said exit nozzle, said back-flush manifold block having at least one orifice disposed therethrough, each of said at least one orifice being in communication with one of said first conduits, means positioned within said at least one orifice to permit flow only in a direction downstream from said at least one flavor supply tank to said exit nozzle, at least one passageway within said manifold block, each said at least one passageway being in communicative relation with a respective orifice, a manifold conduit in registry with said at least one passageway, a pressure responsive valve element disposed within each of said at least one passageway, said valve element being positioned between each said at least one orifice and said manifold conduit, and a drain line connected to one end of said manifold conduit.

4. A selective beverage dispensing apparatus comprising flavor supply tanks, a water carbonating apparatus, an exit nozzle having a discharge opening through which mixed drinks are discharged, discharge preclusion means, said discharge preclusion means being removably associated with respect to the discharge opening of said exit nozzle to cause closure thereof, a plurality of first conduits providing communication between said flavor supply tanks and said exit nozzle, a second conduit providing communication between said water carbonating apparatus and said exit nozzle, a back-flush manifold block interposed between said plurality of first conduits and said exit nozzle, said back-flush manifold block having a plurality of orifices disposed therethrough, each of said orifices being in communication with one of said plurality of first conduits, a removably seated ball check element positioned within each of said orifices to permit flow only in a direction downstream from said flavor supply tanks to said exit nozzle, a plurality of passageways each being in communicative relation with a respective orifice, a manifold conduit in common registry with said passageways, a pressure responsive valve element disposed within each of said passageways, the sensitivity of said valve element being adjustable from without the said back-flush manifold block, said valve element being positioned between each of said orifices and said manifold conduit, and a drain line connected to one end of said manifold conduit.

5. In an apparatus wherein carbonated water and at least one flavor syrup are mixed and dispensed therefrom, the combination comprising, a carbonated water source and at least one flavor syrup source, said carbonated water source being under a greater head of pressure than the pressure head of said at least one flavor syrup source; a conduit block; an exit nozzle having an opening through which mixed drinks are discharged; and discharge preclusion means, said discharge preclusion means being removable attachable over the opening of said exit nozzle and adapted to cause closure thereof; a first orifice within said conduit block providing communication between said carbonated water source and said exit nozzle, at least one second orifice within said conduit block providing communication between said at least one flavor syrup source and said exit nozzle, whereby attachment of said discharge preclusion means over the opening of said exit nozzle causes flow of said carbonated water through said at least one second orifice in the direction of said at least one flavor syrup source.

6. In an apparatus according to claim 5 wherein said discharge preclusion means comprises a plug member sealingly attachable with respect to the opening of said exit nozzle.

7. In an apparatus wherein carbonated water and at least one flavor syrup are mixed and dispensed therefrom, the combination comprising, a carbonated water source and at least one flavor syrup source, said carbonated water source being under a greater head of pressure than the pressure head of said at least one flavor syrup source; an exit nozzle having an opening through which mixed drinks are discharged; a mixing zone within said exit nozzle, said mixing zone being communicably related with said opening, a first conduit connecting said carbonated water source with said mixing zone, at least one second conduit connecting said at least one flavor syrup source with said mixing zone, and discharge preclusion means, said discharge preclusion means being removably attachable over the opening of said exit nozzle to effectuate closure thereof and consequent flow of carbonated water through said at least one second conduit in the direction of said at least one flavor syrup source.

8. In an apparatus wherein water and at least one flavor syrup are mixed and dispensed therefrom, the combination comprising a pressurized water source, flavor supply tanks, an exit nozzle having an opening through which mixed drinks are discharged, a mixing zone within said exit nozzle, said mixing zone being communicably related with said opening, a plurality of first conduits providing communication between the respective flavor supply tanks and said mixing zone, a second conduit providing communication between said pressurized water source and said mixing zone, a back-flush manifold block connectedly interposed between said plurality of first conduits and said mixing zone, said back-flush manifold block having a plurality of orifices disposed therethrough, each of said orifices being in communication with one of said plurality of first conduits, means positioned within said orifices to permit flow only in a direction downstream from said flavor supply tanks to said mixing zone, a plurality of passageways within said back-flush manifold block each passageway being in communicative relation with a respective orifice, a manifold conduit in common registry with said passageways, a pressure responsive valve element disposed within each of said passageways, said valve element being positioned between each of said orifices and said manifold conduit, a drain line connected to one end of said manifold conduit, and discharge preclusion means removably attached over the opening of said exit nozzle thus effectuating closure thereof and consequent flow of pressurized water through said mixing zone, thence through at least one of said plurality of first conduits in the direction of said back-flush manifold block, thence through at least one said orifices disposed within said manifold block and thence through said manifold conduit for egress through said drain line.

9. In an apparatus wherein water and a flavor syrup are mixed and dispensed therefrom, the combination comprising a pressurized water source; a flavor syrup source;

an exit nozzle having water and flavor syrup inlet openings, a discharge opening through which mixed drinks are discharged and a mixing zone disposed intermediate of and in communication with said inlet and discharge openings; a first conduit connecting said pressurized water source and said water inlet opening, a second conduit connecting said flavor syrup source and said flavor syrup inlet opening; and discharge preclusion means removably attachable over said discharge opening, attachment of said means thus effecting closure of said discharge opening and consequent flow of water through said first conduit and thence into said mixing zone and therefrom into said second conduit.

References Cited in the file of this patent
UNITED STATES PATENTS

| | | |
|---|---|---|
| 2,194,681 | Wheler et al. | Mar. 26, 1940 |
| 2,371,188 | Russel | Mar. 13, 1945 |
| 2,850,213 | Cole | Sept. 2, 1958 |
| 2,906,435 | Nichols | Sept. 29, 1959 |
| 2,955,726 | Feldman et al. | Oct. 11, 1960 |
| 3,009,653 | Hedeman | Nov. 21, 1961 |